(12) United States Patent
Newman et al.

(10) Patent No.: US 8,037,469 B2
(45) Date of Patent: Oct. 11, 2011

(54) SYSTEM AND METHOD OF CONFIGURING COMPUTER SETTINGS

(75) Inventors: Nader Newman, Brampton (CA);
Ayman Sydhom, Markham (CA)

(73) Assignee: Psion Teklogix Inc., Mississauga (CA)

( * ) Notice: Subject to any disclaimer, the term of this patent is extended or adjusted under 35 U.S.C. 154(b) by 1368 days.

(21) Appl. No.: 11/545,335

(22) Filed: Oct. 10, 2006

(65) Prior Publication Data
US 2008/0098379 A1    Apr. 24, 2008

(51) Int. Cl.
*G06F 9/445*   (2006.01)
(52) U.S. Cl. ............................. 717/169; 717/175
(58) Field of Classification Search .................. None
See application file for complete search history.

(56) References Cited

U.S. PATENT DOCUMENTS 7,496,890 B2 *  2/2009  Miller et al. ................... 717/107

OTHER PUBLICATIONS

Norton, P., "Peter Norton's Complete Guide to Windows 2000 Server", published by Sams Publishing, Indianapolis, IN USA, Mar. 2000, pp. 422-428.

* cited by examiner

*Primary Examiner* — Chuck Kendall
(74) *Attorney, Agent, or Firm* — Pearne & Gordon LLP

(57) ABSTRACT

A computer settings configuration system and method for configuring computer settings are provided. The computer settings configuration system comprises a loading module for loading into computer readable memory a subset of computer setting variables and a modification module for modifying computer system settings corresponding with the subset of computer setting variables. The method comprises the steps of loading into computer readable memory a subset of computer setting variables and modifying computer system settings corresponding with the subset of computer setting variables.

49 Claims, 12 Drawing Sheets

SYSTEM AND METHOD OF CONFIGURING COMPUTER SETTINGS

FIELD OF INVENTION

The present invention to a system and method of configuring computer settings.

BACKGROUND OF THE INVENTION

The hardware of a computer generally comprises an IO (Input Output) system for receiving information from a user and communicating information to the user, a CPU (Central Processing Unit) for processing data, volatile memory such as RAM or VRAM (Random Access Memory or Video Random Access Memory) and non volatile memory such as a hard drive or a floppy disk drive.

The hardware of a computer requires software to provide additional functionality. As computers have become more powerful, the software has also become more powerful. Most people are familiar with using a computer to run a particular program such as Microsoft Word. Most people are also familiar with an operating system that runs on the computer. A typical OS, such as Microsoft Windows or Mac OS X, allows a user to work with multiple programs at the same time. An OS helps control lower level functionality of the computer system. The lower level functionality can comprise the control of graphic cards for displaying information, the control of network cards, process and thread management. One skilled in the art will appreciate that this is a simplistic overview of an OS. The OS is a complex piece of software, with many different settings that a user can change. These settings are typically stored in registry keys. A software program such as Microsoft Word may also require numerous settings to be saved in a non volatile way, to do this the program stores the information or data relating to the setting or variable in the registry.

The registry files on a windows OS typically comprise thousands of registry keys. In order for a user to change a computer setting, they must navigate through the registry file, typically accomplished using a registry editor such as RegEdit, and locate the specific key they wish to change. A user must have knowledge of the particular registry key, and where it is located in the registry in order to change its value. Due to the large number of registry keys this can be a time consuming process.

As an example, if a user wished to change a common WiFi setting for multiple radios they would have to search through the registry and change the following keys every time they wanted to manipulate the values.

---

HKLM\Comm\WLAGS46b1\Parms\
SystemScale = Dword 1
HKLM\Comm\NETWLAN1\Parms
APDensity = Dword 1
HKLM\Comm\IMWEBN51\Parms
APDensity = Dword 1
HKLM\Comm\CF8385PN1\Parms
APDensity = Dword 1

---

Once the user has changed the required key values in the registry, if they wish to revert back to the previous configuration, from AP density of 2 to 1 as above, the process of locating the individual keys and changing each value must be done again.

There have been attempts to overcome some of the problems encountered when editing a registry file.

A previous attempt to address some of these shortcomings combines all of the prior Control Panel applets into one consolidated Network Setup Control Panel. This requires a centralized database or Configuration Library consisting of collected data relating to available configuration settings. It provides for the configuration of computer settings through the use of scripting. In order to modify a configuration a Scripting Server and a Scripting Plug-In must be used. The Scripting Plug-In supports changing a configuration setting. If the Scripting Plug-In does not support changing a configuration setting, the user is not able to easily change it. A new Scripting Plug-In would need to be written to support the configuration setting.

Another attempt to address the shortcomings addressed the problem of modifying configuration files in a secured operating system. The method was addressed to allowing a user to change registry key values when the key has higher security level than the user. This is achieved through the use of a Patch program. The patch program is designed to modify certain registry keys. If a user wishes to modify a registry key value not comprised in the patch program, a new Patch program would need to be written to change the key.

There is therefore a need for a system that can enable or configure computer settings without requiring the user to manually edit individual registry keys.

SUMMARY OF THE INVENTION

The present invention relates to a computer settings configuration system and method of use for configuring computer settings.

It is an object of the invention to obviate or mitigate at least one of the shortcomings of the prior art.

In accordance with an embodiment of the present invention, there is preferably provided a computer settings configuration system for configuring computer settings. The computer settings configuration system comprises a loading module for loading into computer readable memory a subset of computer setting variables and a modification module for modifying computer system settings corresponding with the subset of computer setting variables.

In accordance with another embodiment of the present invention, there is preferably provided a method of configuring computer settings. The method comprises the steps of loading into computer readable memory a subset of computer setting variables and modifying computer system settings corresponding with the subset of computer setting variables.

In accordance with another embodiment of the present invention, there is preferably provided a computer readable medium storing the instructions or statements for use in the execution in a computer of a method for configuring computer settings. The method comprises the steps of loading into computer readable memory a subset of computer setting variables and modifying computer system settings corresponding with the subset of computer setting variables.

In accordance with another embodiment of the present invention, there is preferably provided electronic signals for use in the execution in a computer of a method for configuring computer settings. The method comprises the steps of loading into computer readable memory a subset of computer setting variables and modifying computer system settings corresponding with the subset of computer setting variables.

In accordance with another embodiment of the present invention, there is preferably provided a computer program product for use in the execution in a computer of a method for configuring computer settings. The computer program product comprises a loading module for loading into computer readable memory a subset of computer setting variables and a modification module for modifying computer system settings corresponding with the subset of computer setting variables.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
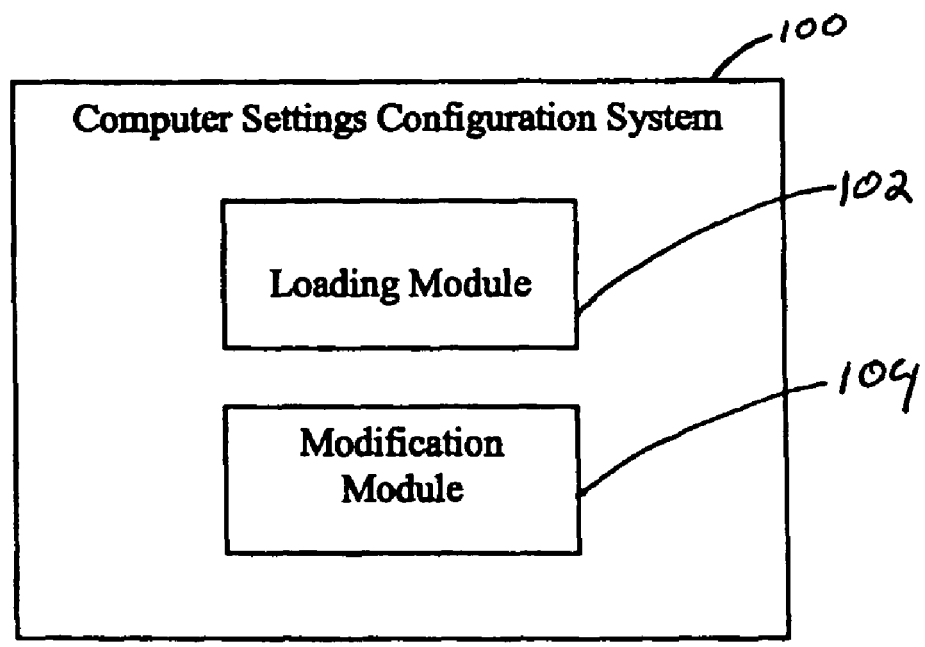
FIG. 1 depicts an example of a computer settings configuration system for configuring computer setting, in accordance with an embodiment of the present invention.

Specific embodiments of the computer settings configuration system will now be described with reference to the drawings. Similar elements are represented by like numerals.

The following description is of a preferred embodiment of a computer settings configuration system and method of use. The preferred embodiment and method of use are designed to allow a user to create, store, set and reset complex registry settings via XML files. The computer settings configuration system and method of use further describes a user interface to allow a user to create, store, set and reset complex registry settings via XML files in a simple fashion. Further it allows the settings to be stored in a single location. The tool may also be a stand-alone application not tied to any particular operating system.

The Registry

The registry is the system database. It stores information on configuration settings of the systems hardware, software and users of the system. The Operating System (OS) refers to the registry for information on configuring the system, such as user settings, installed software, installed hardware, and registered ports. Programs on the system can add information to the database, as well as read information from the database, some programs are able to edit and delete information. The registry acts as a central repository for all the variables and their values that affect the system. An example of one key present in the registry is a key to control the size of the fonts in the system. This key is stored as HKLM\System\GDI\SYSFNT\HT.

The registry is organized in a hierarchical manner. There are root keys, sub keys and values, arranged in tree structures. The root of the tree structure is represented by root keys. An example of a root key name is HKEY_USERS. Each root key can have multiple sub keys, and each sub key in turn can have sub keys. The sub keys of a root key are organized into nodes of the tree structure. The leaves of the tree structure comprises information on the name of the value, the type of data stored as well as a value for the data.

There are 4 basic data types used in the registry file. They are SZ, which can store a string, a string being plain readable text; MSZ which is a multi string; BINARY, which can store 16 bits of binary data; and, DWORD, which can store 32 bits of binary data. A sub key has information relating to at least one value name, the data type of the value, and the value itself. The value name, data type and value are collectively referred to as a Key Variable. A sub key may have one or more Key Variables. A sub key may also comprise further sub keys.

In order to change the value of a particular registry key, the user must issue a command to the OS specifying which key to modify. The command to modify a registry is typically generated by a program designed to edit the registry by calling commands that form part of the OS's Application Program Interface (API). In a preferred embodiment these calls are the CreateKey and DeleteKey calls.

The General Overview of the Invention

A preferred embodiment is described in which the computer setting variables are registry keys. The computer settings configuration system allows a user to define groups of registry keys by functionality, as the user wishes to define it. A user can define a group comprising a subset of registry keys. The subset of registry keys may comprise multiple registry keys, a single registry key, or a valid name of a registry key not currently in the system registry. By activating the group, the invention sets all of the key values in the registry corresponding to the subset of registry keys in the group to the values of the group keys. Predefined groups of registry keys can also be provided to the user.

FIG. 1 depicts an example of a computer settings configuration system 100 for configuring computer setting, in accordance with an embodiment of the present invention. The computer settings configuration system 100 comprises a loading module 102 for loading into computer readable memory a subset of computer setting variables, and a modification module 104 for modifying computer system settings corresponding with the subset of computer setting variables. Other components may be added to the computer settings configuration system.

Figure 2:
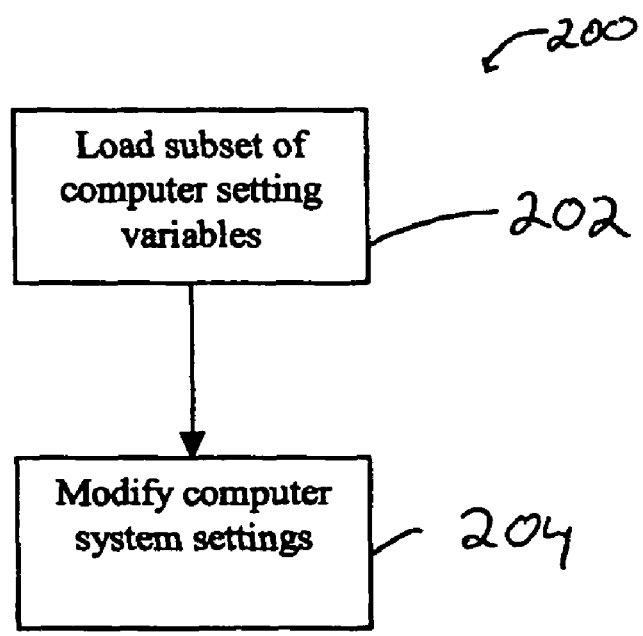
FIG. 2 depicts in a flowchart an example of a method of using the computer settings configuration system, in accordance with an embodiment of the computer settings configuration system.

FIG. 2 depicts in a flowchart an example of a method of configuring computer settings. The method begins with the step of loading into computer readable memory a subset of computer setting variables 202. Next, computer system settings corresponding with the subset of computer setting variables are modified 204. Other steps may be added to the method 200.

Figure 3:
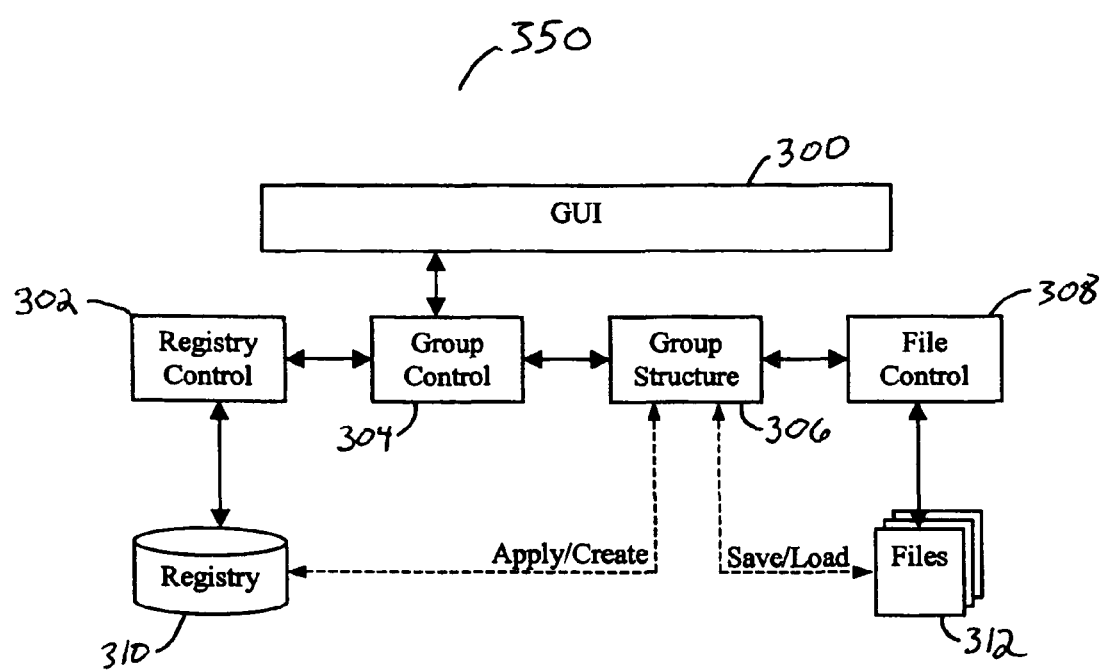
FIG. 3 depicts in a process flow diagram an example of a process overview, in accordance with an embodiment of the computer settings configuration system.

FIG. 3 depicts in a process flow diagram an example of a process overview 350 of a preferred embodiment of the computer settings configuration system 100. Graphical User Interface (GUI) 300 is the interface used for displaying the different information to the user as well as providing a means of obtaining user input. Registry Control 302 provides for reading and writing from and to the registry 310. This can be to read what keys are currently in the registry, modifying values of current registry keys, creating new registry keys and deleting existing registry keys. Group Control 304 provides for the manipulation of groups of registry keys created by a user or predefined groups of registry keys. Group Structure 306 is a structure present in computer memory representing a group of registry keys, not all parts of the group structure 306 need to be present in computer memory at the same time. File Control 308 provides for the reading and writing of Group Structures 306 from and to non volatile computer memory. Registry 310 is the Operating System's registry files. Files 312 represent the files comprising one or more Group Structures 306 stored in non volatile computer memory.

FIG. 3 represents a conceptual partition of the current invention. The functionality represented by the different blocks of FIG. 3 may overlap each other, or additional blocks may be present.

Editing the Registry

Figure 4:
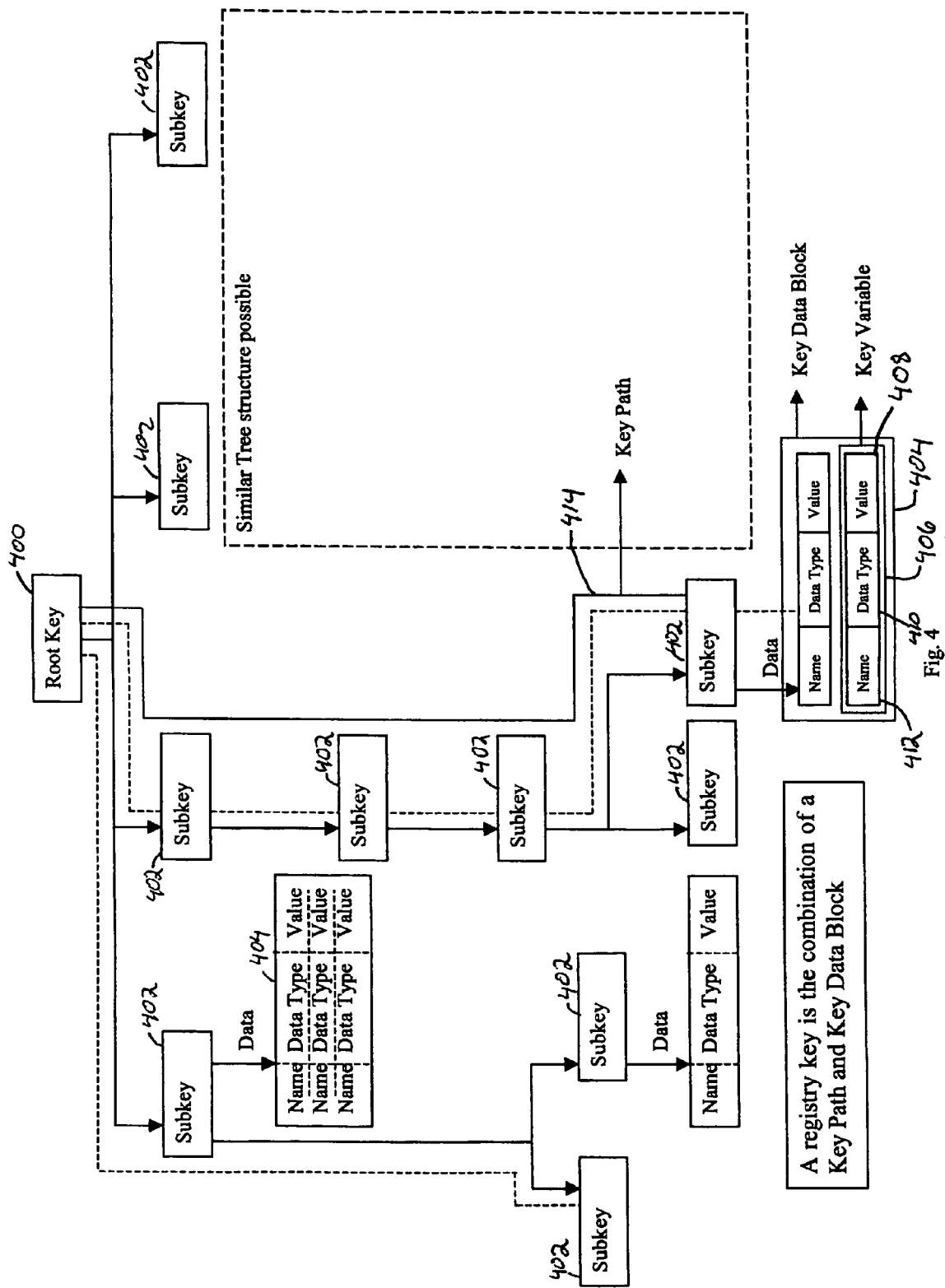
FIG. 4 shows a schematic diagram an example of an organizational structure of an OS's registry, in accordance with an embodiment of the computer settings configuration system.

FIG. 4 shows in a schematic diagram an example of an organizational structure of an OS's registry 310, in accordance with an embodiment of the computer settings configuration system 100. The registry structure is organized as a hierarchical tree structure. Root Key 400 is the root node of the tree structure. Subkeys 402 are child nodes of the root node. Each node comprises a Key Data Block 404. The Key Data Block 404 comprises one or more Key Variables 406. Each Key Variable 406 in turn comprises a Name 412 identifying the Key Variable 406, a Data Type 410 specifying the type of the data of the Key Variable 406, and a Value 408 comprising the information of the Key Variable 406. A Key Path 414 identifies the nodes of a the registry tree structure traversed to arrive at a particular Subkey 402 and associated Key Data Block 404.

A Value 408 of a particular Key Variable 406 may be modified by calling CreateKey with the appropriate Key Path 414, the Key Variable Name 412, the Data Type 410 of the Key Variable being changed and the changed Value 408.

A new Subkey 402 may be created by calling CreateKey with a valid, new Key Path 414, a Key Variable Name 412, the Data Type 410 of the Key Variable 406 being added and the new Value 408.

A new Key Variable 406 may be added to an existing Subkey 402 by calling CreateKey with an existing Key Path 414, with a new Key Variable Name 412, the Data Type 410 of the Key Variable 406 being added and the new Value 408.

An existing Subkey 402 may be deleted by calling DeleteKey with the Key Path 414 of the Subkey 402 to be deleted. This will delete all Key Variables 406 associated with the Subkey 402. A particular Key Variable 406 may be deleted by calling DeleteVal with the appropriate Key Path 414 and Key Variable Name 412.

Group Structures

Figure 5:
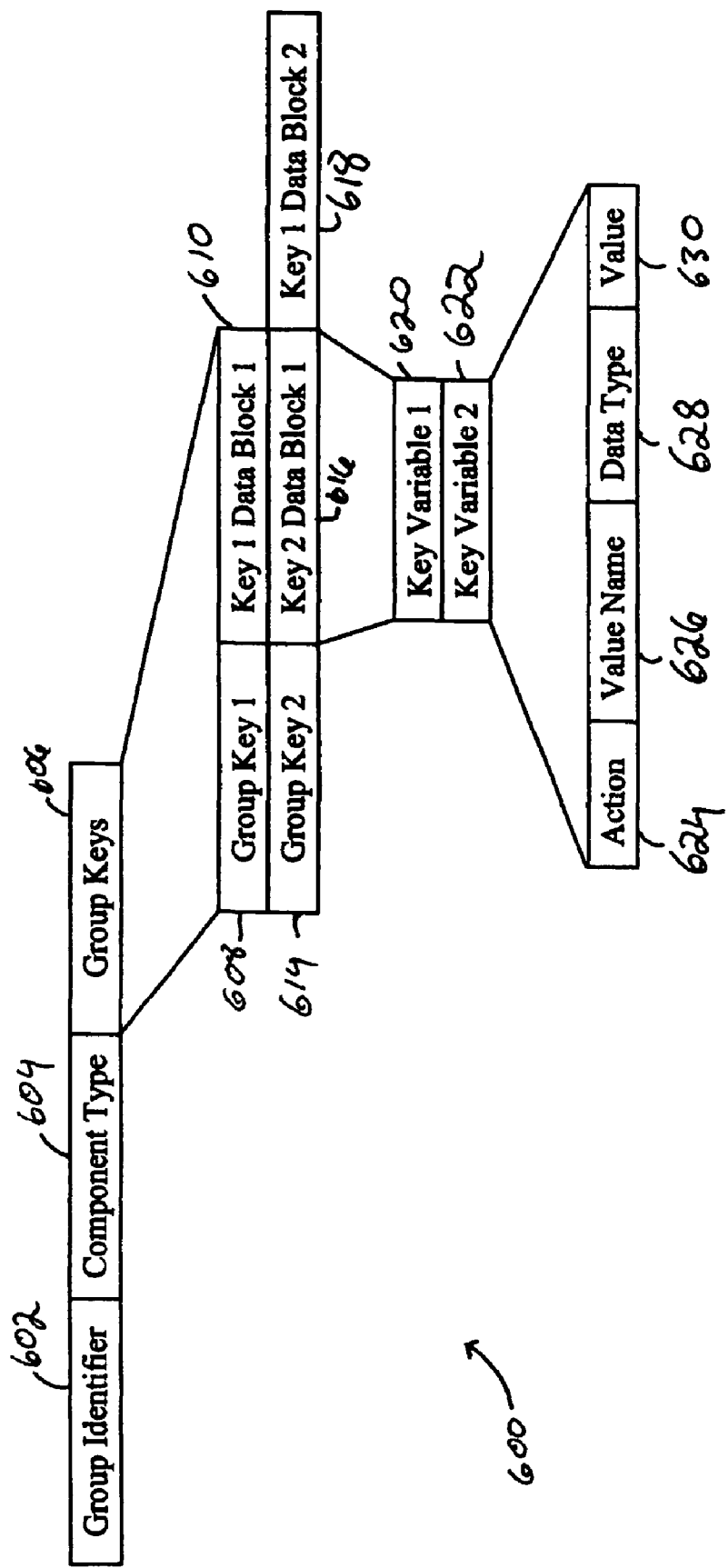
FIG. 5 shows in a component diagram an example of a group structure, in accordance with an embodiment of the computer settings configuration system.

FIG. 5 shows in a component diagram an example of a Group Structure 600, in accordance with an embodiment of the computer settings configuration system 100. The current invention does not require all parts of the Group Structure 600 be located in computer memory at the same time. There exist various ways of implementing the Group Structure 600.

Group Structure 600 comprises a Group Identifier (ID) 602, a Component Type 604, and Group Keys 606. The Group ID 602 uniquely identifies the subset of registry keys belonging to the particular Group Structure 600. The Component Type 604 identifies the input method used for specifying the manner in which the registry keys corresponding to the Group Keys 606 comprised in the Group Structure 600 are to be modified. The Group Keys 606 correspond to the registry Subkeys 402 that belong to the Group Structure 600. The Group Keys 606 comprise at least one Group Key 608 identifying a registry Subkey by its Key Path 414, and at least one Group Key Data Block 610 associated with the Group Key 608. The Group Keys 606 may comprise additional Group Keys 614 and associated Group Key Data Blocks 616, 618. Each Group Key 608, 614 comprises one or more Group Key Data Blocks 610, 616, 618 depending on the Component Type 604 of the Group Structure 600. Each Key Data Block 610, 616, 618 comprises one or more Group Key Variables 620, 622. A Group Key Variable 620, 622 corresponds to a Key Variable 406 of the registry 310. The Group Key Variable 620, 622 does not need to correspond to an existing Key Variable 406 of the registry 310. In addition to the Value Name 626, Data Type 628 and Value 630 which correspond directly to the Key Variable 406 of the registry 310. The Group Key Variable 622 also comprises an Action 624. The Action 624 associated with each Group Key Variable 620, 622 specifies the manner in which the corresponding Key Variable 406 of the registry is to be modified if the Action is applied. The modifications may include adding, deleting, or changing the value of the registry 310 Key Variable 406 corresponding to the Group Key Variable 620, 622. A Group Key Data Block 610, 616, 618 is also referred to as a Setting State. Activating a particular Setting State or Group Key Data Block 610, 616, 618 will apply each defined action and associated values with a Group Key Variable 620, 622 to the corresponding Key Variable 406 of the registry 310.

XML Group Structure

Figure 6:
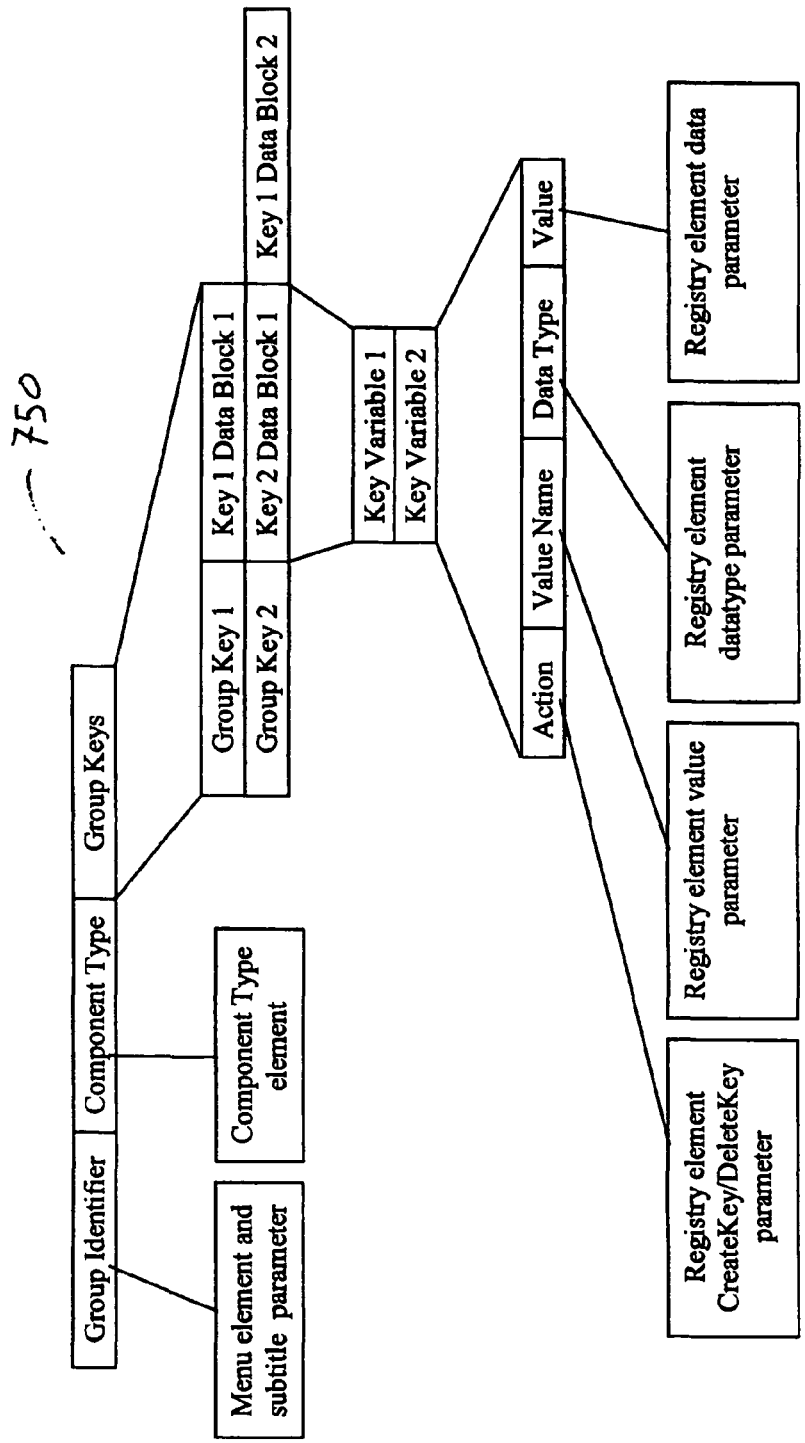
FIG. 6 shows in a component diagram an example of the correspondence between the group structure and the XML elements of an XML group structure, in accordance with an embodiment of the computer settings configuration system.

The Group Structure 600 may be implemented in various forms in a computer system. One embodiment can use a linked list type of data structure to comprise the Group Structure information In a preferred embodiment of the computer settings configuration system, XML is used to store the Group Structures 600. FIG. 6 shows in a component diagram an example of the correspondence 750 between the Group Structure 600 and the XML elements of an XML Group Structure, in accordance with an embodiment of the computer settings configuration system 100.

Figure 7:
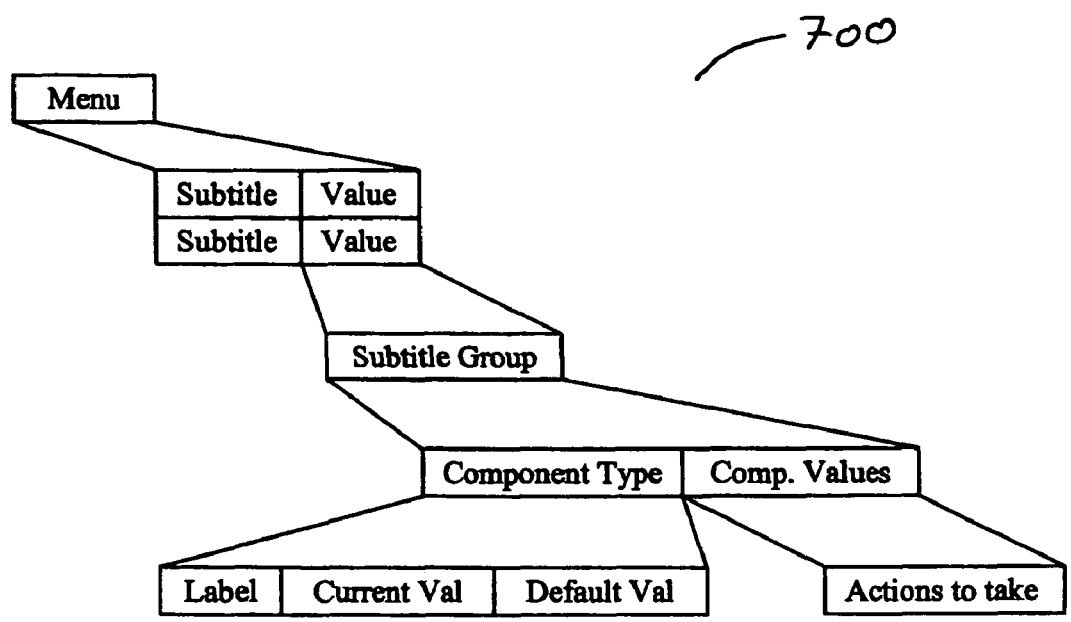
FIG. 7 shows in a component diagram an example of an XML Menu group structure, in accordance with an embodiment of the computer settings configuration system.

FIG. 7 shows in a component diagram an example of an XML Menu group structure 700, in accordance with an embodiment of the computer settings configuration system 100. Below is a listing of the various elements in the XML file format.

```
<element type="Menu" name="menu text">
    <param type="subtitle" name="subtitle text"
    value="%component%"/>
    .
    .
    .
</element>
<element type=Component>
    Element types
    .
```

```
.
.
</element>
<element type="CheckBox">
    <param name="Label" value="%label text%/">
    <param name= "CurrentState" value= "True/False"/>
    <param name= "DefaultState" value= "True/False"/>
</element>
<element type="TextBox">
    <param name= "Label" value= "%label text%"/>
    <param name="CurrentState" value="%Text%"/>
</element>
<element type= "ComboBox">
    <param name="Label" value="%label text%/">
    <param name="Item" value="%Item text displayed%"
    Value/ItemValue="%value%"
    <param name="CurrentValue" value="Value/ItemValue"/>
    <param name="DefaultValue" value="Value/ItemValue"/>
</element>
<element type="TrackBar">
    <param name="Label" value="%label text%/">
    <param name="Min" value="%integer%/">
    <param name="Max" value="%integer%/">
    <param name="CurrentValue" value="Value/ItemValue"/>
    <param name="DefaultValue" value="Value/ItemValue"/>
</element>
<element type=Registry>
    <param name="CreateKey" value=Key Path>
    <param name="ValueName" value=Value Name data=Value datatype=Data Type>
    <param name="DeleteKey" value=Key Path>
    <param name="DeleteVal" value=Key Path data=Key Value Name>
</element>
```

The elements that are present in the XML File format are: Menu, Component, CheckBox, TextBox, ComboBox, TrackBar and Registry. The Component and Registry elements are general elements. There may be different element types in specific implementations.

The Menu element is used as an identifier to organize similar Group Structures 600 or XML Group Structures together. The subtitle parameter indicates which Group Structure 600 or XML Group Structure is associated with the menu. Each subtitle parameter has a name and a value. The value identifies the Component that is associated with a particular subtitle.

The Component element corresponds to the XML Group Structure. The Type of the component element is defined by the user and corresponds to a subtitle parameter of a Menu element. In one embodiment the first element to appear in the component element's body is a Component Type element. The Component Type element may be a CheckBox, TextBox, ComboBox or TrackBar. The Component Type determines the number of Settings States. A CheckBox element has two Settings States, they are the TRUE and FALSE states. Both the TextBox and the TrackBar each have one Settings State. The ComboBox may have a varying number of Setting States.

The CheckBox element allows for two Settings States. It has three parameters, Label, CurrentValue and DefaultValue. The value of the Label parameter will be used to display the Component or Group Structure 600. The CurrentValue stores the current value of the CheckBox. The DefaultValue stores the default value of the CheckBox.

The TextBox is used as an element to receive text input from a user. The TextBox may be useful when the value is a string that cannot be predefined. An example would be the host name of a server.

The ComboBox element lists the items and their corresponding values. The Value will be the types of the Component elements, separated by a semicolon, that will comprise a list of keys, which will be changed by selecting the particular item. In the case where just the value for the item needs to be passed to a registry key ItemValue will be used.

The TrackBar is used to allow a user to set a value for an element between a min and max value.

The Registry element is used to define a Settings State. A parameter that has a name of CreateKey will create the registry key specified by the Key Path 414 in the value parameter. If the Key already exists its value will be modified. A parameter the has a name of DeleteKey will delete the registry key specified by the Key Path 414 in the value parameter. A parameter the has a name of DeleteVal will delete the registry key variable specified by the Key Path 414 in the value parameter and the registry key value name in the data parameter. Following a CreateKey parameter is one or more parameters representing the Key Variables 620, 622 of the Setting State. Each parameter has a name, value, data and datatype. The name identifies the parameter as a Key Variable 620, 622, and the value, data, and datatype correspond to the value, data and datatype of the corresponding registry 310 Key Variable 406.

An example of an XML file using the XML File format is presented at the end of the detailed description. It describes seven XML Group Structures organized under two menu headings. The menu headings are Advanced Interface and Network Settings, and Advanced Services Settings. The seven XML Group Structures are IntrDrvSup, IPv6, APDensity, RadioPwrMan, ModemLog, SNTPSvr, and FTPSvr.

Each XML Group Structure is associated with a Menu element by a subtitle parameter. The name of the parameter is used for displaying the group. The value of the parameter is used to identify the corresponding XML Group Structure or Component element in the XML file.

Each XML Group Structure is identified with a type corresponding to the subtitle value parameter. An XML Group Structure element comprises at least two other elements. The first element is a Component Type element. The Component Type element defines the input method required to select or control the values or actions of the XML Group Structure or corresponding Group Structure. This is done by activating or selecting a Settings State. The Component Types have a label parameter, the value of which is used to display the Component.

The CheckBox, TextBox and TrackBar Component Type also has CurentValue and DefaultValue parameters. These are used to store the current value of the Group Structure 600 and the default value of the Group Structure 600.

The ComboBox Component Type has an Item parameter the itemValue of which is a multi string used to define the number and names of the Registry elements for the component.

Following the Component Type element is one or more Registry elements, also considered Setting States. The number and name of the Registry elements depends on the Component Type. The specific Type of a registry element will correspond with the value parameter of the associated subtitle.

For a CheckBox Component Type, two Setting States are required, one is an element type True, the other is an element type False.

For a ComboBox Component Type the number of Setting States is variable. It is determined by the definition of the Component Type element ItemValue parameter. The name of Each Setting State, or Component element type is separated by a semicolon.

For a TrackBar and TextBox there is only one Settings State. The value to be used is obtained from the user either as text input into the TextBox control, or as a value obtained from the TrackBar control.

The use of XML to store the Group Structures 600 allows for additional Group Structures 600 to be added without having to recompile the computer settings configuration system 100. Multiple XML files may be present on a computer system. In a preferred embodiment of the current invention two XML files are present. One is an Advanced System Settings XML file that comprises predefined Group Structures 600 and Setting States. The file is stored on the computer system as a system file so that access to and modification of it is not possible by a regular user. The second file is a user defined file comprising the Group Structures 600 and Settings States defined by the user.

A user may create the user defined XML file using a text editor program by following the format described above. Alternatively they can use the Wizard described below to create an XML file.

Although only two files are present in the preferred embodiment, this limitation is to ensure the invention is simple to use. Options for additional files are easily incorporated into the preferred embodiment of the computer settings configuration system.

Figure 11:
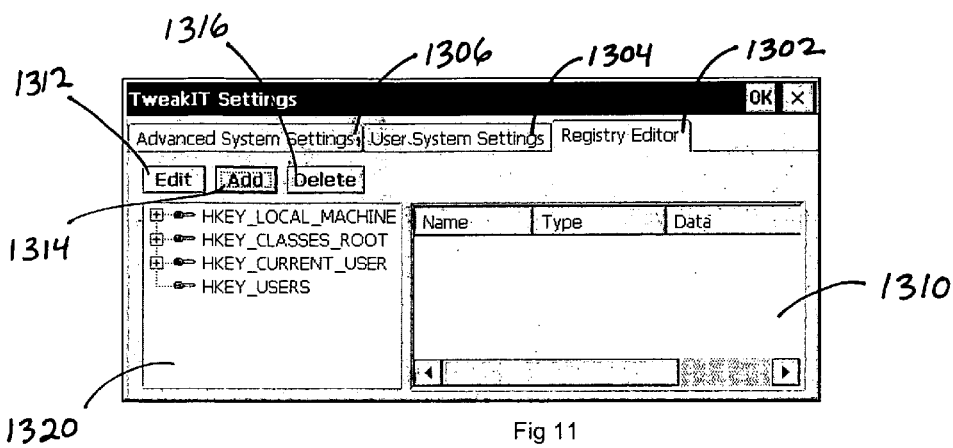
FIGS. 11, 12 and 13 show in screenshots examples of a preferred embodiment of the GUI used to interact with the computer settings configuration system.
Figure 12:
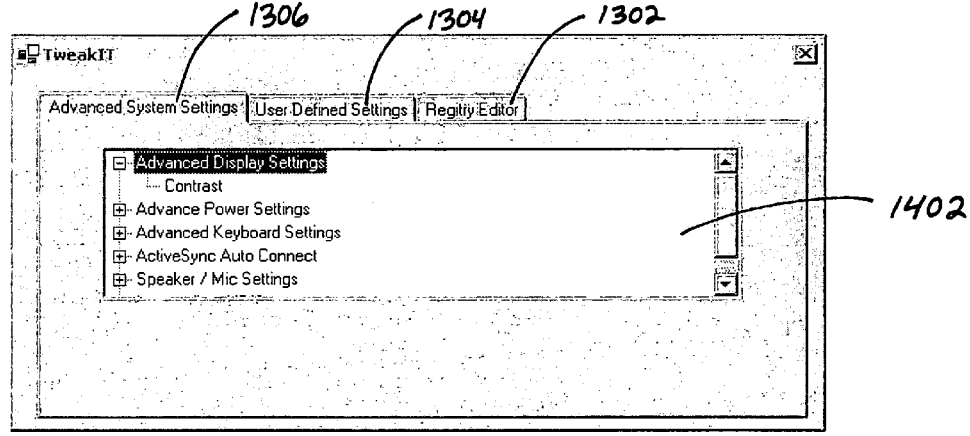
Figure 13:
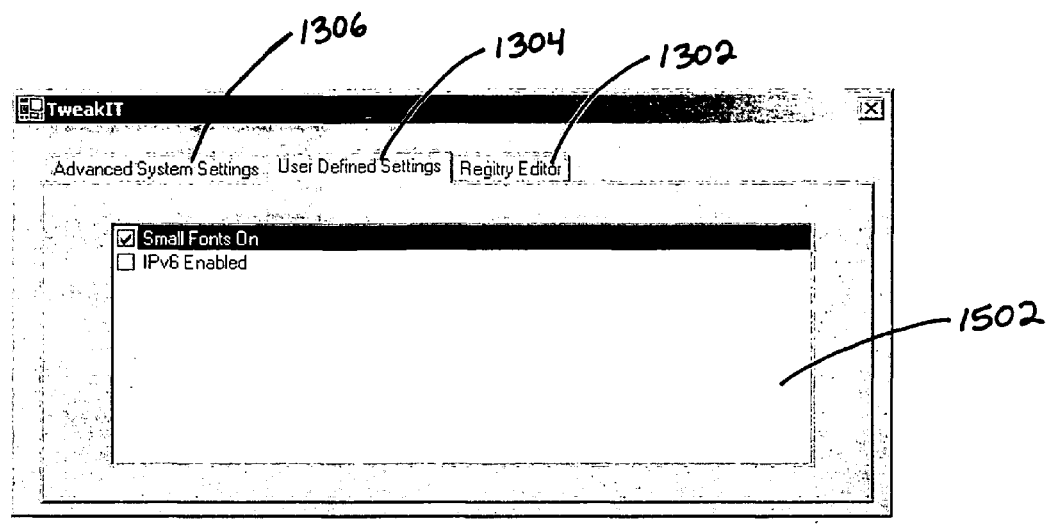

FIGS. 11, 12 and 13 show in screenshots an example of a preferred embodiment of the GUI 300 used to interact with the computer settings configuration system 100. Three tabs are present in the GUI 300. They are the Registry Editor Tab 1302, the User Defined Settings Tab 1304 and the Advanced System Settings Tab 1306. When a user selects any tab a corresponding panel is displayed.

More or less tabs can be present. For example, A text editor tab may be included to allow a user to create or edit an XML file, or the Advanced System Settings Tab 1306 and the User Defined Tab 1304 could be combined into a single tab. The GUI 300 presented is designed for ease of use, other embodiments are possible.

FIG. 11 shows an example of a possible panel for the Registry Editor Tab 1302. Two display panes 1310 and 1320 are present. Display pane 1320 is used to display the registry tree structure. A user can navigate through the registry 310 key 400/subkey 402 structure by interacting with this pane 1320.

Display pane 1310 is used to display the key data block 404 of the selected registry key. The registry key is selected in display pane 1320.

Three buttons are present in the Registry Editor Tab 1302. They are Edit 1312, Add 1314 and Delete 1316.

Figure 8A:
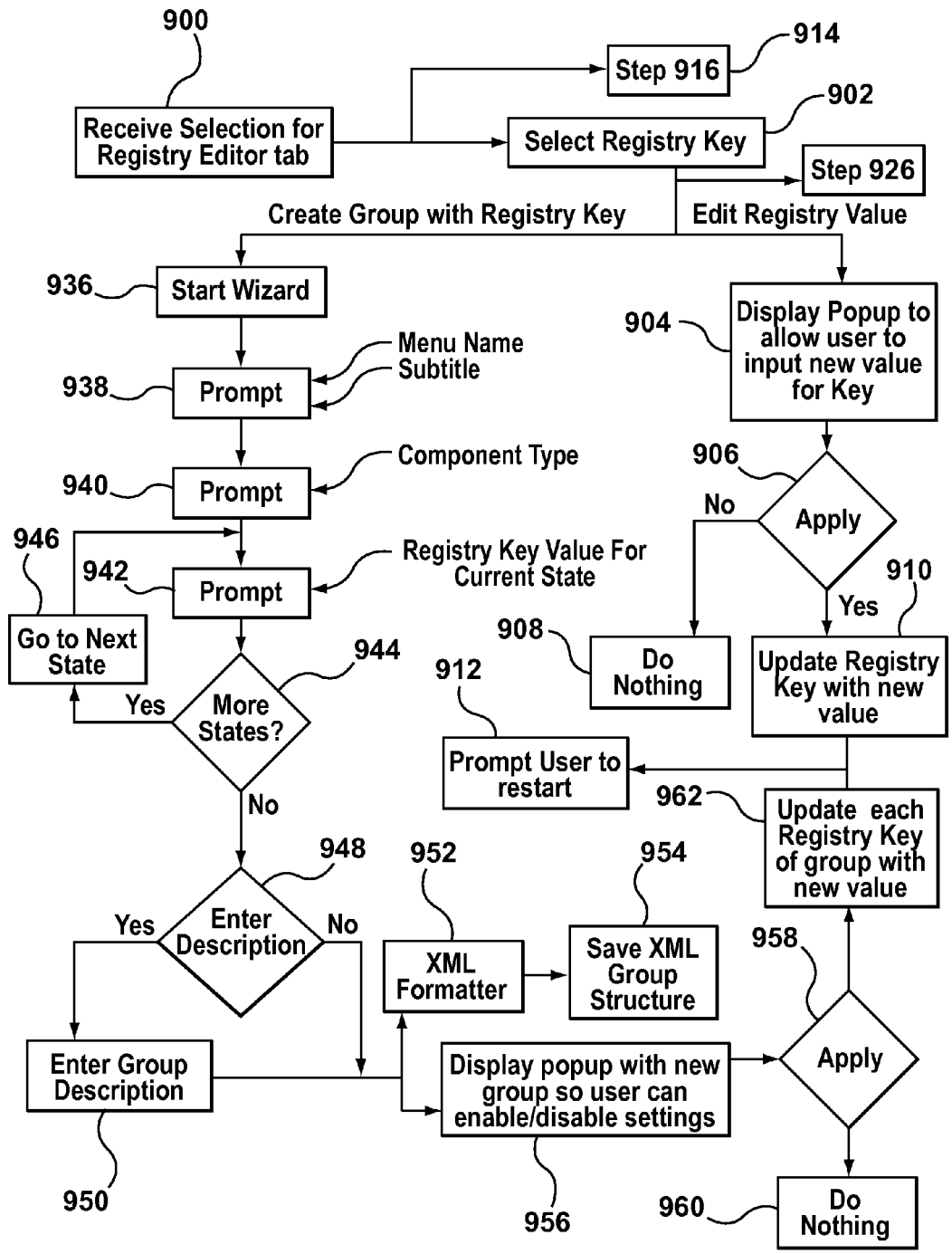
FIGS. 8A and 8B show in a flowchart an example of interactions with the registry editor tab, in accordance with an embodiment of the computer settings configuration system.
Figure 8B:
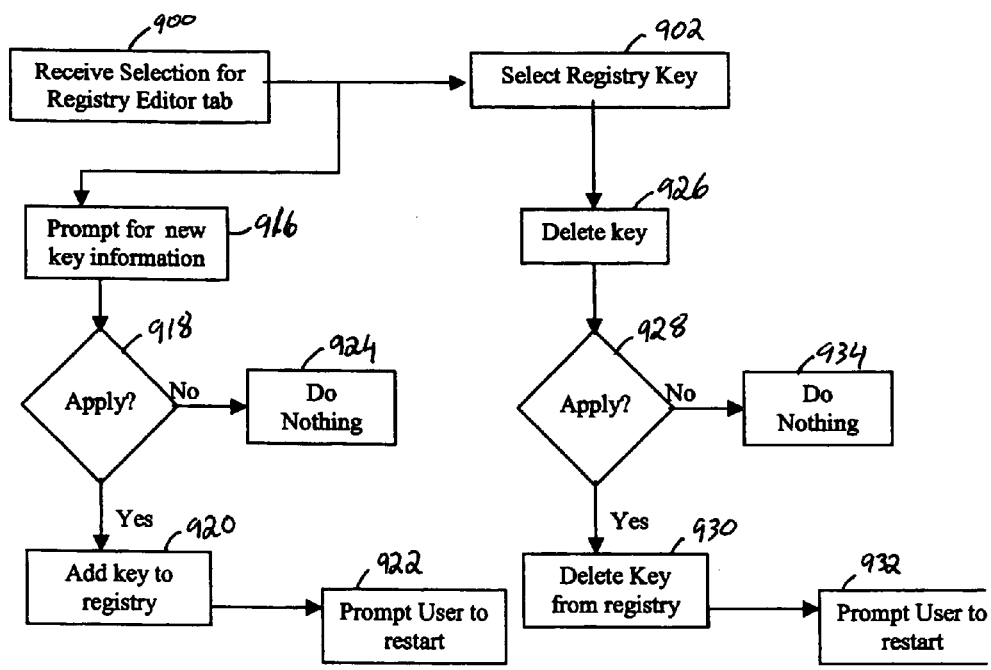

FIGS. 8A and 8B show in a flowchart an example of interactions with the registry editor tab 1302, in accordance with an embodiment of the computer settings configuration system 100. The user selects the Registry Editor Tab 1302 at 900 by clicking on the tab 1302. The user may select a registry key using display pane 1320 at step 902 or they may add a new registry key at step 914 by clicking on the Add button 1314.

Clicking the Add button 1314 will display a popup 916 allowing the user to specify the information of the registry key to be added. The information includes the Key Path 414, and information on the Key Variables 406 including the Name 412, DataType 414 and Data 416. Once the information is added the user is prompted 918 to determine if the information is correct and that they want to add the specified key to the registry 310. If the user chooses to add the new registry key to the registry 310 it is added using the CreateKey call with the information entered. Once the registry 310 is updated at step 920 the user is prompted 922 to restart the computer system before the updates take effect. If the user does not wish to add the specified registry key the information is discarded at step 924.

If a user selects a registry key at 902, they may wish to delete the key, edit the value or use the wizard.

The user may click the Delete button 1316 at step 926. The user will then be prompted 928 whether they wish to delete the selected key or not. If the user wishes to delete the key it is deleted 930 using the DeleteKey call with information indicating the selected key. If the user has selected a specific registry key variable 406 it is deleted using the DeleteVal call with the information indicating the selected registry key and registry key variable 406. The user is then prompted 932 to restart the computer system before the updates take effect. If the user does not wish to delete the specified registry key the information is discarded at step 934.

Clicking on the Edit button 1312 will display a popup 904 to allow the user to input the new value for the selected registry key. Once the new information is entered, the user is prompted 906 if they wish to edit the registry key is specified. If they wish to do so the selected registry key is updated with the new information at 910. The user is then prompted 912 that the computer system must be restarted before the updates take effect. If the user does not wish to edit the selected registry key as specified, the information is discarded at step 908

Clicking the Wizard button 1318 will start the Wizard at step 936. The Wizard is designed to step the user through creating a Group Structure 600. It will create a corresponding XML Group Structure and store it in an XML file. It allows them to add registry keys to the group and set the values of the keys for each Setting State. In a preferred embodiment the Component Type is limited to the CheckBox, so that the registry keys added only have a True and False value associated with them.

The Wizard will prompt 938 the user to enter a Menu Name and Subtitle for the Group Structure 600. The Menu name may exist in the XML file already or it may be a new menu name. The subtitle is the Group Structure identifier 602. The user is then prompted 940 for the Component Type 604. In the preferred embodiment this step is omitted since the Wizard only allows the CheckBox Component Type 604. The user is then prompted 942 to enter the Key Variable 626, 628, 630 information for the current Settings State for the Group Keys 606. The Key Variable 626, 628, 630 information may include new values for the key or it may indicate to delete the specified key for the particular Settings State. Once the Settings State information is entered the Wizard determines if there are more Settings States to be defined by the user 944, and if there are the Wizard advances to the next Settings State 946 and the process of defining the Settings State begins again at step 942. If there are no more Settings States to be defined the user is given the option of entering a description for the Group at step 948. A Group Description may be entered at step 950. The Wizard then uses the entered information to create an XML Group Structure using an XML Formatter at step 952. The XML formatter adds the necessary XML tags to the Group Structure 600. The XML Group Structure is then added to the User Defined Settings XML File at step 954. If the Menu element specified already exists in the XML then the new subtitle is added as a parameter of the Menu element. If the Menu specified does not exist in the XML file, a new menu element is added with the appropriate subtitle parameter as specified.

In a preferred embodiment of the computer settings configuration system 100, the Wizard only saves the XML file to a predetermined location. It is possible to design the Wizard to prompt the user to specify the desired location in which to store the XML file.

After completion of the Wizard, a popup is displayed 956 with the newly created Group, allowing the user to activate a Setting State. Once a Setting State is activated, or selected the user is prompted if they wish to apply the new settings 958. If they do not want to apply the settings, they are discarded at step 960. If they wish to apply the new settings, the registry 310 is updated according to the selected Setting State at step 962, and then the user is prompted to restart the computer system at step 964.

Activating a Settings State gathers the required information to set the Registry Keys as desired, from the XML Group Structure or Group Structure 600. If the Settings States are for a CheckBox or ComboBox no user input is required at the time of activation to set the required values. The user input selects a Settings State which comprises the defined Values. If the Settings State is for a TextBox or a TrackBar user input is used at the time of activation to specify the desired value.

FIG. 12 shows in a screenshot an example of a possible embodiment of the Advanced System Settings Tab 1306, in accordance with an embodiment of the computer settings configuration system 100. One Display pane 1402 is presented to the user. The display pane 1402 displays the Group Structures 600 defined in the Advanced Systems Settings XML file and allows the user to navigate the Group Structures 600. A user may select a Group Structure 600 by double clicking it. A popup then appears allowing the user to activate a particular Settings State.

Figure 9:
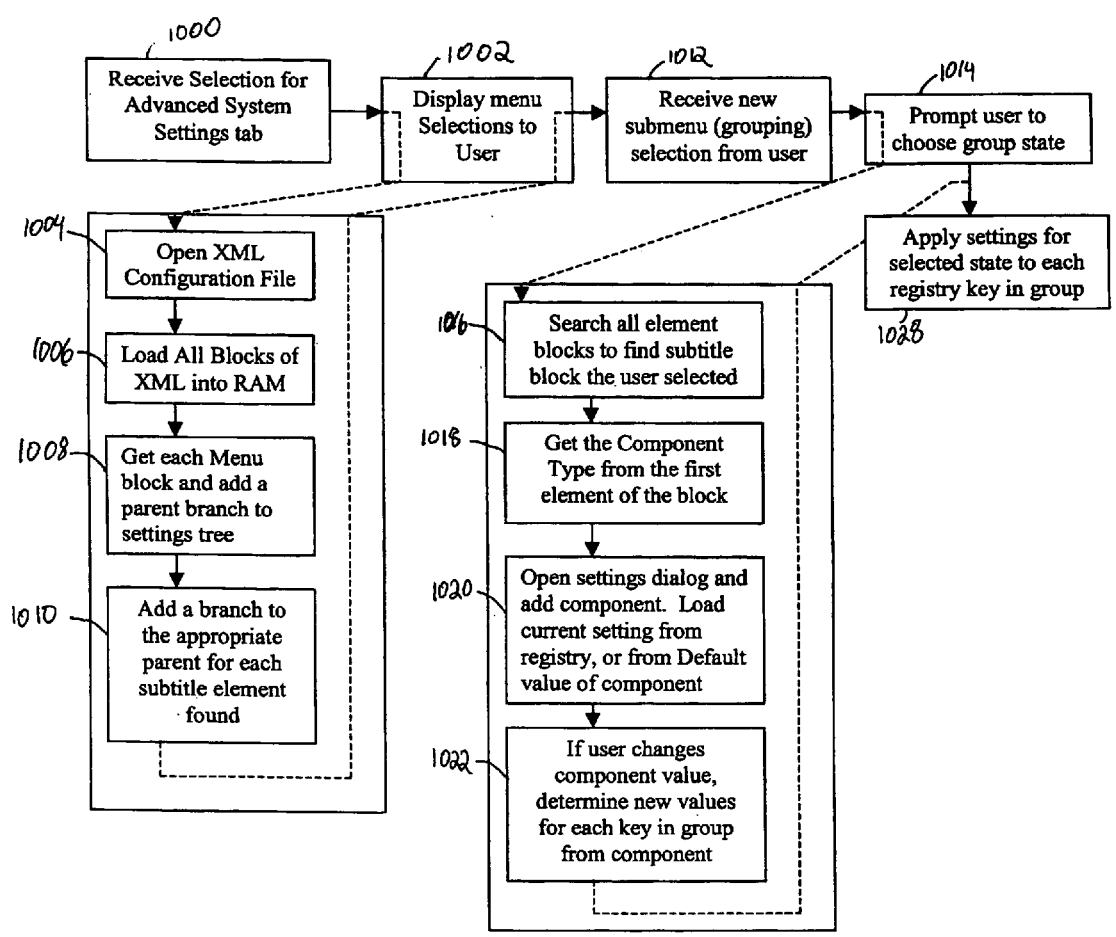
FIG. 9 shows in a flowchart an example of a method for the advanced systems settings tab, in accordance with an embodiment of the computer settings configuration system.

FIG. 9 shows in a flowchart an example of a method for the Advanced System Settings Tab 1306, in accordance with an embodiment of the computer settings configuration system 100. The user selects the Advanced System Settings Tab 1306 at step 1000. Step 1002 displays the Group Structures 600 to the user in display pane 1402. Step 1002 involves the steps of opening the Advanced System Settings XML file at step 1004. The file is opened using an XML Parser which identifies all of the XML elements in the file. The parser loads the XML elements into operative memory at step 1006, as Group Structures 600. The elements in memory are searched to retrieve all the Menu elements. Each Menu element is added as a parent in the display Pane 1402 at step 1008. Each Menu element is then searched to determine the subtitle parameters that are added to the display pane 1402 under the parent menu at step 1010. The user then selects a displayed Group Structure 600 from the display pane 1402 at step 1012. Once a Group Structure 600 is selected the user is prompted to activate by selecting a Settings State at step 1014. Step 1014 involves the steps 1016 which searches all the element blocks to locate the Component element of the type specified in the subtitle parameter the user selected. Once the element is found the Component type is retrieved at step 1018. The Component type is the type of the first element in the Group. A settings dialog box is opened and the Component type is added to the dialog display at step 1020. The current settings are loaded from the registry 310. If the current settings cannot be determined the default value settings, as specified in the Group Structure 600 are used. The dialog allows the user to select the Setting State to activate at 1022. A setting State may be selected in various ways depending on the component type. A checkbox may be checked or unchecked to activate the True or False Settings State. A user may select one of the options of the combobox to activate the corresponding Settings State. The user may input a value in a TextBox control or select a value using the trackbar to activate the Setting State of the Group. Once the Setting State is activated the user may be prompted 1024 whether they wish to apply the selected Setting State. If the user does not wish to activate the selected Settings State the information is discarded at step 1026. If the user wishes to activate the selected Settings State, then step 1028 applies the actions specified in the Settings State to modify the registry keys of the Group. The user is then prompted to restart the computer system at step 1030.

In one embodiment the user defined settings tab 1304 functions in an identical manner as the Advanced System Settings Tab 1306 except that the XML filed opened at step 1004 is the User Defined Settings Tab 1304 instead of the Advanced System Settings Tab 1306.

Figure 10:
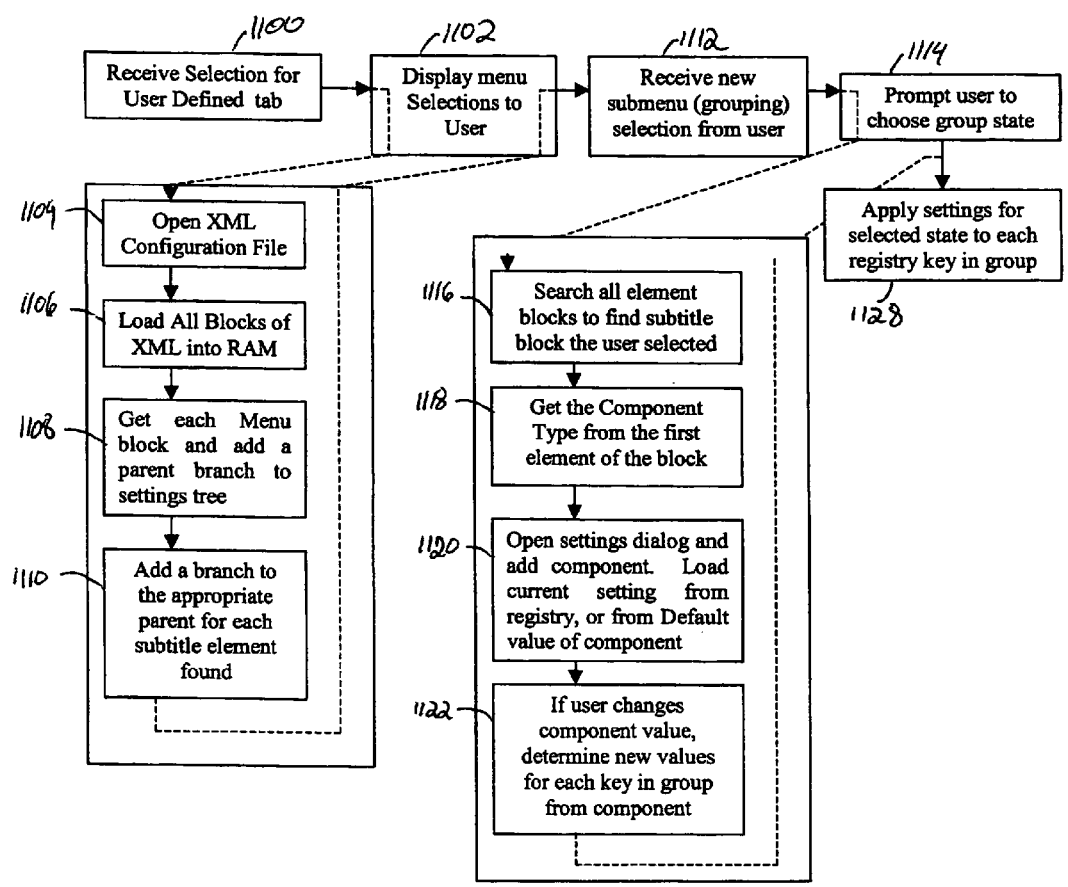
FIG. 10 shows in a flowchart an example of a method for the user defined settings tab, in accordance with an embodiment of the computer settings configuration system.

FIG. 10 shows in a flowchart an example of a method for the User defined Settings Tab 1304, in accordance with an embodiment of the computer settings configuration system 100. The user selects the User Defined Settings Tab 1304 at step 1100. Step 1102 displays the Group Structures 600 to the user in display pane 1502. Step 1102 involves the steps of opening the XML User Defined Settings file at step 1104. The file is opened using an XML Parser which identifies all of the XML elements in the file. The parser loads the elements into operative memory at step 1106. The elements in memory are searched to retrieve all the Menu elements. Each Menu element is added as a parent in the display Pane 1502 at step 1108. Each Menu element is then searched to determine the subtitle parameters which are added to the display pane 1502 under the parent menu at step 1110. The user then selects a displayed Group Structure 600 from the display pane 1502 at step 1112. Once a Group Structure 600 is selected the user is prompted to activate a Settings State at step 1114. Step 1114 involves the steps 1116 which searches all the element blocks to locate the Component element of the type specified in the subtitle parameter the user selected. Once the element is found the Component type is retrieved at step 1118. The Component type is the type of the first element in the Group. A settings dialog box is opened and the Component type is added to the display at step 1120. The current settings are loaded from the registry 310. If the current settings cannot be determined the default value settings are used. The dialog allows the user to select the Setting State to activate at 1122. A setting State may be selected in various ways depending on the component type. A checkbox may be checked or unchecked to activate the True or False Settings State. A user may select one of the options of the combobox to activate the corresponding Settings State. The user may input a value in a TextBox control or select a value using the trackbar to activate the Setting State of the Group. Once the Setting State is activated the user may be prompted 1124 whether they wish to apply the selected Setting State. If the user does not wish to activate the selected Settings State the information is discarded at step 1126. If the user wishes to activate the selected Settings State, then step 1128 applies the actions specified in the Settings State to modify the registry keys of the Group. The user is then prompted to restart the computer system at step 1130.

FIG. 13 shows in a screenshot another example of the User Defined Settings Tab 1304, in accordance with an embodiment of the computer settings configuration system 100. In this embodiment Steps 1100 to 1116 are the same as described above. In this embodiment the Component Type is restricted to the CheckBox so step 1118 is not necessary to determine the Component Type. A check box is then displayed next to the corresponding Group in the display pane, as such it is not necessary to open a dialog box as in step 1120. The user may check or uncheck the box to activate a Setting State. Steps 1122 to 1130 are as described above.

The embodiments of the computer settings configuration system 100 are discussed in view of setting registry keys of an Operating System such as Microsoft Windows™; however it would be readily apparent to one skilled in the arts that the method and system described could easily apply to changing any settings that are stored on the system. As an example, the program could be adapted to allow a user to easily change complex settings specific to a program, such as a database program.

Example XML File

```xml
<?xml version="1.0" ?>
<?doc version="5"?>
<?device type="Terminal"?>
<TweakIT>
<element type="Menu" name="Advanced Interface and Network Settings">
   <param type="subtitle" name="Intermediate Driver Support" value="IntDrvSup" />
   <param type="subtitle" name="Enable IPv6" value="IPv6" />
   <param type="subtitle" name="AP Density" value="APDensity" />
   <param type="subtitle" name="Radio Power Management" value="RadioPwrMan" />
   <param type="subtitle" name="Modem Logging" value="ModemLog" />
</element>
<element type="Menu" name="Advanced Services Settings">
   <param type="subtitle" name="SNTP Server" value="SNTPSvr" />
   <param type="subtitle" name="FTP Server" value="FTPSvr" />
</element>
<element type="IPv6">
   <element type="CheckBox">
      <param name="Label" value="Enable IPv6" />
      <param name="CurrentValue" value="False" />
      <param name="DefaultValue" value="False" />
   </element>
   <element type="True">
      <param name="CreateKey" value="HKLM\Comm\AFD" />
      <param name="ValueName" value="Stacks" data="tcpstk;irdastk;btd;tcpip6" datatype="MSZ" />
   </element>
   <element type="False">
      <param name="CreateKey" value="HKLM\Comm\AFD" />
      <param name="ValueName" value="Stacks" data="tcpstk;irdastk;btd" datatype="MSZ" />
   </element>
</element>
<element type="IntDrvSup">
   <element type="CheckBox">
      <param name="Label" value="Disable the Intermediate drvier" />
      <param name="CurrentValue" value="False" />
      <param name="DefaultValue" value="False" />
   </element>
   <element type="True">
      <param name="DeleteKey" value="HKLM\Comm\PTXIMWEBN511" />
      <param name="DeleteKey" value="HKLM\Comm\PTXINTERMEDIATENDIS" />
      <param name="DeleteKey" value="HKLM\Comm\PTXWLAGS46b1" />
      <param name="DeleteVal" value="HKLM\Comm\WLAGS46b1\Parms" data="UpperBind" />
   </element>
   <element type="False">
      <param name="CreateKey" value="HKLM\Comm\PTXIMWEBN511" />
      <param name="CreateKey" value="HKLM\Comm\PTXIMWEBN511\Parms\ETHMAN" />
      <param name="ValueName" value="good" data="77" datatype="Dword" />
      <param name="ValueName" value="low" data="83" datatype="Dword" />
      <param name="ValueName" value="nosignal" data="93" datatype="Dword" />
      <param name="ValueName" value="verygood" data="68" datatype="Dword" />
      <param name="ValueName" value="verylow" data="89" datatype="Dword" />
      <param name="CreateKey" value="HKLM\Comm\PTXIMWEBN511\Parms\Tcpip" />
      <param name="ValueName" value="TcpDelAckTicks" data="2" datatype="Dword" />
      <param name="ValueName" value="TcpInitialRTT" data="1" datatype="Dword" />
      <param name="CreateKey" value="HKLM\Comm\PTXINTERMEDIATENDIS" />
      <param name="ValueName" value="Group" data="NDIS" datatype="SZ" />
      <param name="ValueName" value="ImagePath" data="ptxIntermediateNdis.dll" datatype="SZ" />
      <param name="ValueName" value="NoDeviceCreate" data="1" datatype="Dword" />
      <param name="CreateKey" value="HKLM\Comm\PTXWLAGS46b1" />
      <param name="ValueName" value="BusNumber" data="0" datatype="Dword" />
      <param name="ValueName" value="BusType" data="0" datatype="Dword" />
      <param name="CreateKey" value="HKLM\Comm\PTXWLAGS46b1\Parms\ETHMAN" />
      <param name="ValueName" value="good" data="77" datatype="Dword" />
      <param name="ValueName" value="low" data="83" datatype="Dword" />
      <param name="ValueName" value="nosignal" data="93" datatype="Dword" />
      <param name="ValueName" value="verygood" data="68" datatype="Dword" />
      <param name="ValueName" value="verylow" data="89" datatype="Dword" />
      <param name="CreateKey" value="HKLM\Comm\PTXWLAGS46b1\Parms\Tcpip" />
      <param name="ValueName" value="TcpDelAckTicks" data="2" datatype="Dword" />
      <param name="ValueName" value="TcpInitialRTT" data="1" datatype="Dword" />
      <param name="CreateKey" value="HKLM\Comm\WLAGS46b1\Parms" />
      <param name="ValueName" value="UpperBind" data="PTXINTERMEDIATE" datatype="Binary" />
   </element>
</element>
<element type="APDensity">
   <element type="ComboBox">
      <param name="Label" value="Set AP Density" />
      <param name="Item" value="Low;Medium;High" itemValue="Low;Medium;High;" />
   </element>
   <element type="Low">
      <param name="CreateKey" value="HKLM\Comm\WLAGS46b1\Parms" />
      <param name="ValueName" value="SystemScale" data="1" datatype="Dword" />
      <param name="CreateKey" value="HKLM\Comm\NETWLAN1\Parms" />
      <param name="ValueName" value="APDensity" data="1" datatype="Dword" />
      <param name="CreateKey" value="HKLM\Comm\IMWEBN51\Parms" />
      <param name="ValueName" value="APDensity" data="1" datatype="Dword" />
      <param name="CreateKey" value="HKLM\Comm\CF8385PN1\Parms" />
      <param name="ValueName" value="APDensity" data="1" datatype="Dword" />
   </element>
   <element type="Medium">
      <param name="CreateKey" value="HKLM\Comm\WLAGS46b1\Parms" />
      <param name="ValueName" value="SystemScale" data="2" datatype="Dword" />
      <param name="CreateKey" value="HKLM\Comm\NETWLAN1\Parms" />
      <param name="ValueName" value="APDensity" data="2" datatype="Dword" />
      <param name="CreateKey" value="HKLM\Comm\IMWEBN51\Parms" />
      <param name="ValueName" value="APDensity" data="2" datatype="Dword" />
```

-continued
```
        <param name="CreateKey"
value="HKLM\Comm\CF8385PN1\Parms" />
        <param name="ValueName" value="APDensity" data="2"
datatype="Dword" />
    </element>
    <element type="High">
        <param name="CreateKey"
value="HKLM\Comm\WLAGS46b1\Parms" />
        <param name="ValueName" value="SystemScale" data="3"
datatype="Dword" />
        <param name="CreateKey"
value="HKLM\Comm\NETWLAN1\Parms" />
        <param name="ValueName" value="APDensity" data="3"
datatype="Dword" />
        <param name="CreateKey"
value="HKLM\Comm\IMWEBN51\Parms" />
        <param name="ValueName" value="APDensity" data="3"
datatype="Dword" />
        <param name="CreateKey"
value="HKLM\Comm\CF8385PN1\Parms" />
        <param name="ValueName" value="APDensity" data="3"
datatype="Dword" />
    </element>
</element>
<element type="RadioPwrMan">
    <element type="CheckBox">
        <param name="Label" value="Enable Radio Power Management"
/>
        <param name="CurrentValue" value="False" />
        <param name="DefaultValue" value="False" />
    </element>
    <element type="True">
        <param name="CreateKey"
value="HKLM\Comm\WLAGS46b1\Parms" />
        <param name="ValueName" value="PMEnabled" data="1"
datatype="Dword" />
        <param name="ValueName" value="PowerMode" data="1"
datatype="Dword" />
        <param name="CreateKey"
value="HKLM\Comm\NETWLAN1\Parms" />
        <param name="ValueName" value="PowerIndex" data="1"
datatype="Dword" />
        <param name="CreateKey"
value="HKLM\Comm\IMWEBN51\Parms" />
        <param name="ValueName" value="PSMode" data="2"
datatype="Dword" />
    </element>
    <element type="False">
        <param name="CreateKey"
value="HKLM\Comm\WLAGS46b1\Parms" />
        <param name="ValueName" value="PMEnabled" data="0"
datatype="Dword" />
        <param name="ValueName" value="PowerMode" data="0"
datatype="Dword" />
        <param name="CreateKey"
value="HKLM\Comm\NETWLAN1\Parms" />
        <param name="ValueName" value="PowerIndex" data="0"
datatype="Dword" />
        <param name="CreateKey"
value="HKLM\Comm\IMWEBN51\Parms" />
        <param name="ValueName" value="PSMode" data="1"
datatype="Dword" />
    </element>
</element>
<element type="ModemLog">
    <element type="CheckBox">
        <param name="Label" value="Enable Logging to File
(\MdmLog.txt)" />
        <param name="CurrentValue" value="False" />
        <param name="DefaultValue" value="False" />
    </element>
    <element type="True">
        <param name="CreateKey"
value="HKLM\Drivers\Unimodem\Settings" />
        <param name="ValueName" value="MdmLogFile" data="1"
datatype="Dword" />
    </element>
    <element type="False">
        <param name="CreateKey"
value="HKLM\Drivers\Unimodem\Settings" />
        <param name="ValueName" value="MdmLogFile" data="0"
datatype="Dword" />
    </element>
</element>
<element type="FTPSvr">
    <element type="CheckBox">
        <param name="Label" value="Disable FTP Server" />
        <param name="CurrentValue" value="True" />
        <param name="DefaultValue" value="True" />
    </element>
    <element type="True">
        <param name="CreateKey" value="HKLM\Drivers\COMM\FTPD"
/>
        <param name="ValueName" value="IsEnabled" data="1"
datatype="Dword" />
    </element>
    <element type="False">
        <param name="CreateKey" value="HKLM\Drivers\COMM\FTPD"
/>
        <param name="ValueName" value="IsEnabled" data="0"
datatype="Dword" />
    </element>
</element>
<element type="SNTPSvr">
    <element type="TextBox">
        <param name="Label" value="SNTP Server Name" />
        <param name="CurrentValue" value="" />
        <param name="DefaultValue" value="" />
    </element>
    <element type="Value">
        <param name="CreateKey" value="HKLM\Services\Timesvc" />
        <param name="ValueName" value="Server" data="ItemValue"
datatype="SZ" />
    </element>
</element>
</TweakIT>
```

The system and methods according to the present disclosure may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present disclosure, as well as the hardware, software and the combination thereof.

While particular embodiments of the patent disclosure have been shown and described, changes and modifications may be made to such embodiments without departing from the true scope of the patent disclosure.

What is claimed is:

1. A computer settings configuration system for configuring computer settings, the computer settings configuration system comprising:
 a loading module for loading into computer readable memory a subset of computer setting variables, the subset of computer setting variables being associated with a group structure, the group structure comprising:
  a group identifier (ID) for identifying the subset of computer setting variables; and
  at least one settings state for defining actions and associated values used to modify computer system settings of an operating system; and
 a modification module for modifying the computer system settings corresponding with the subset of computer setting variables, the modification including activating the at least one settings state.

2. The computer settings configuration system as claimed in claim 1, wherein the group structure comprises:

at least one group key comprising the subset of computer setting variables.

3. The computer settings configuration system as claimed in claim 1, further comprising a means for obtaining associated values with the at least one settings state.

4. The computer settings configuration system as claimed in claim 3 wherein the group structure comprises at least one group key comprising the subset of computer setting variables, and the means for obtaining values associated with the settings state comprises means for selecting a settings state with associated values for each group key, the associated values for each group key being defined in the selected settings state.

5. The computer settings configuration system as claimed in claim 3 wherein the group structure comprises at least one group key comprising the subset of computer setting variables, and the means for obtaining values associated with the at least one settings state comprises means for obtaining user input defining the values for the associated values of each group key.

6. The computer settings configuration system as claimed in claim 1 further comprising a storing module for storing the group structure in a computer readable form.

7. The computer settings configuration system as claimed in claim 1 wherein the loading module comprises means for loading into the computer readable memory the group structure from a file comprising at least one group structure.

8. The computer settings configuration system as claimed in claim 1 wherein the loading module comprises at least one of:
 means for entering the group ID;
 means for selecting one or more than one subset of computer setting variables as group keys;
 means for designating the at least one settings state for the group structure; and
 means for assigning values to each group key for the at least one settings state.

9. The computer settings configuration system as claimed in claim 6 wherein the storing module comprises:
 means for creating an XML group structure corresponding to the group structure; and
 means for writing the XML group structure to an XML file format in computer readable memory.

10. The computer settings configuration system as claimed in claim 9 wherein the means for writing the XML group structure comprises means for creating a new XML file comprising the XML group structure.

11. The computer settings configuration system as claimed in claim 9 wherein the means for writing the XML group structure comprises means for amending an existing XML file comprising a previous XML group structure with the XML group structure.

12. The computer settings configuration system as claimed in claim 7 wherein the file is an XML format file comprising at least one XML group structure.

13. The computer settings configuration system as claimed in claim 3 wherein the modification module further comprises means for performing the defined actions of the at least one settings state.

14. The computer settings configuration system as claimed in claim 13 wherein the means for performing the actions of the settings state comprises means for modifying the values of the computer system settings according to the defined actions of the settings state.

15. The computer settings configuration system as claimed in claim 14 wherein the means for modifying the values of the computer setting variables comprises means for changing the values of the computer setting variables.

16. The computer settings configuration system as claimed in claim 14 wherein the means for modifying the values of the computer setting variables comprises means for deleting the computer setting variables.

17. The computer settings configuration system as claimed in claim 14 wherein the means for modifying the values of the computer setting variables comprises means for creating new computer setting variables based on the selected settings state.

18. The computer settings configuration system as claimed in claim 7 wherein the means for loading into computer readable memory the group structure from a file comprises using an XML parser to identify XML group structures in an XML file comprising at least one XML group structure, and creating a corresponding group structure in computer readable memory.

19. The computer settings configuration system as claimed in claim 1 wherein the computer setting variables comprise registry keys.

20. The computer settings configuration system as claimed in claim 1 wherein the settings states comprise a True state and a False state.

21. The computer settings configuration system as claimed in claim 1 further comprising a graphical user interface (GUI) comprising:
 means for displaying a registry editor tab comprising:
 means for displaying the computer setting variables; and
 means for obtaining user input for at least selecting and editing the computer setting variables;
 means for displaying a user defined settings tab comprising:
 means for displaying group structures stored in an user defined XML file;
 means for obtaining user input for selecting a group structure; and
 means for applying a setting state of a group structure; and
 means for displaying an advanced system settings tab comprising:
 means for displaying group structures stored in a predefined XML file;
 means for obtaining user input for selecting a group structure; and
 means for applying a setting state of a group structure.

22. A method of configuring computer settings, the method comprising the steps of:
 associating a subset of computer setting variables with a group structure, the group structure comprising:
 a group identifier (ID) for identifying the subset of computer setting variables; and
 at least one settings state for defining actions and associated values used to modify computer system settings of an operating system;
 loading into computer readable memory the group structure; and
 modifying the computer system settings corresponding with the subset of computer setting variables, including activating the at least one settings state.

23. The method of configuring computer settings as claimed in claim 22, wherein the step of associating comprises:
 identifying the group structure; and
 defining the actions and associated values for each computer setting variable.

24. The method of configuring computer settings as claimed in claim 22, further comprising the step of obtaining associated values with the at least one settings state.

25. The method of configuring computer settings as claimed in claim 24 wherein the group structure comprises at least one group key comprising the subset of computer setting variables, and the step of obtaining values associated with the settings state comprises a step of selecting a settings state with associated values for each group key, the associated values for each group key defined in the selected settings state.

26. The method of configuring computer settings as claimed in claim 24 wherein the group structure comprises at least one group key comprising the subset of computer setting variables, and the step of obtaining values associated with the at least one settings state comprises a step of obtaining user input defining the values for the associated values of each group key.

27. The method of configuring computer settings as claimed in claim 22 further comprising the step of storing the group structure in a computer readable form.

28. The method of configuring computer settings as claimed in claim 22 wherein the step of loading comprises a step of loading into the computer readable memory the group structure from a file comprising at least one group structure.

29. The method of configuring computer settings as claimed in claim 22 wherein the step of loading comprises at least one of:
    entering the group ID;
    selecting one or more than one subset of computer setting variables as group keys;
    designating the at least one settings state for the group structure; and
    assigning values to each group key for the at least one settings state.

30. The method of configuring computer settings as claimed in claim 27 wherein the step of storing the group structure in a computer readable form comprises:
    creating an XML group structure corresponding to the group structure; and
    writing the XML group structure to an XML file format in the computer readable memory.

31. The method of configuring computer settings as claimed in claim 30 wherein the step of writing the XML group structure comprises the step of creating a new XML file comprising the XML group structure.

32. The method of configuring computer settings as claimed in claim 30 wherein the step of writing the XML group structure comprises a step of amending an existing XML file comprising a previous XML group structure with the XML group structure.

33. The method of configuring computer settings as claimed in claim 28 wherein the file is an XML format file comprising at least one XML group structure.

34. The method of configuring computer settings as claimed in claim 24 wherein the step of modifying computer system settings corresponding with the subset of computer setting variables further comprises a step of performing the defined actions of the at least one settings state.

35. The method of configuring computer settings as claimed in claim 34 wherein the step of performing the actions of the settings state comprises a step of modifying the values of the computer system settings according to the defined actions of the settings state.

36. The method of configuring computer settings as claimed in claim 35 wherein the step of modifying the values of the computer setting variables comprises a step of changing the values of the computer setting variables.

37. The method of configuring computer settings as claimed in claim 35 wherein the step of modifying the values of the computer setting variables comprises a step of deleting the computer setting variables.

38. The method of configuring computer settings as claimed in claim 35 wherein the step of modifying the values of the computer setting variables comprises a step of creating new computer setting variables based on the selected settings state.

39. The method of configuring computer settings as claimed in claim 27 wherein the step of loading into computer readable memory a group structure from a file comprises:
    a step of using an XML parser to identify XML group structures in an XML file comprising at least one XML group structure; and
    a step of creating a corresponding group structure in computer readable memory.

40. The method of configuring computer settings as claimed in claim 22 wherein the computer setting variables comprise registry keys.

41. The method of configuring computer settings as claimed in claim 25 wherein the settings states comprise a True state and a False state.

42. The method of configuring computer settings as claimed in claim 22 further comprising a step of using a graphical user interface (GUI) comprising:
    displaying a registry editor tab comprising:
    displaying the computer setting variables; and
    obtaining user input for at least selecting and editing the computer setting variables;
    displaying a user defined settings tab comprising:
    displaying group structures stored in an user defined XML file;
    obtaining user input for selecting a group structure; and
    applying a setting state of a group structure; and
    displaying an advanced system settings tab comprising:
    displaying group structures stored in a predefined XML file;
    obtaining user input for selecting a group structure; and
    applying a setting state of a group structure.

43. A computer readable medium storing the instructions or statements for use in the execution in a computer of a method for configuring computer settings, the method comprising steps of:
    associating a subset of computer setting variables with a group structure, the group structure comprising:
        a group identifier (ID) for identifying the subset of computer setting variables, and
        at least one group key comprising at least one settings state for defining actions and associated values used to modify computer system settings of an operating system;
    loading into computer readable memory the group structure; and
    modifying the computer system settings corresponding with the subset of computer setting variables, including activating the at least one settings state.

44. Electronic signals for use in the execution in a computer of a method for configuring computer settings, the method comprising steps of:
    associating a subset of computer setting variables with a group structure, the group structure comprising:
        a group identifier (ID) for identifying the subset of computer setting variables; and
        at least one settings state for defining actions and associated values used to modify computer systems settings of an operating system;

loading into computer readable memory the group structure; and modifying the computer system settings corresponding with the subset of computer setting variables, including activating the at least one settings state.

45. A computer program product for use in the execution in a computer of a method for configuring computer settings, the computer program product comprising:
   an association module for associating a subset of computer setting variables with a group structure, the group structure comprising:
      a group identifier (ID) for identifying the subset of computer setting variables; and
      at least one settings state for defining actions and associated values used to modify computer system settings of an operating system;
   a loading module for loading into computer readable memory the group structure; and
   a modification module for modifying the computer system settings corresponding with the subset of computer setting variables, including activating the at least one settings state.

46. A computer settings configuration system for configuring computer settings, the computer settings configuration system comprising:
   a loading module for loading into computer readable memory a subset of computer setting variables, the subset of computer setting variables being associated with a group structure, the group structure comprising:
      a group identifier (ID) for identifying the group structure;
      at least one group key comprising the subset of computer setting variables; and
      at least one settings state for defining actions and associated values used to modify computer systems settings, the at least one settings state including at least a True state and a False state;
   means for selecting a settings state with associated values for each group key and obtaining the associated values with the selected settings state, the associated values for each group key being defined in the selected settings state; and
   a modification module for modifying the computer systems settings corresponding with the subset of computer setting variables.

47. A computer settings configuration system for configuring computer settings, the computer settings configuration system comprising:
   a loading module for loading into computer readable memory a subset of computer setting variables, the subset of computer setting variables being associated with a group structure, the group structure comprising:
      a group identifier (ID) for identifying the group structure;
      at least one group key comprising the subset of computer setting variables; and
      at least one settings state for defining actions and associated values used to modify computer systems settings;
   a modification module for modifying the computer system settings corresponding with the subset of computer setting variables; and
   a graphical user interface (GUI) comprising:
      means for displaying a registry editor tab comprising:
         means for displaying the computer setting variables; and
         means for obtaining user input for at least selecting and editing the computer setting variables;
      means for displaying a user defined settings tab comprising:
         means for displaying group structures stored in a user defined XML file;
         means for obtaining user input for selecting a group structure; and
         means for applying a setting state of a group structure; and
      means for displaying an advanced system settings tab comprising:
         means for displaying group structures stored in a predefined XML file;
         means for obtaining user input for selecting a group structure; and
         means for applying a setting state of a group structure.

48. A method of configuring computer settings, the method comprising the steps of:
   associating a subset of computer setting variables with a group structure, comprising:
      identifying the group structure;
      defining actions and associated values for each computer setting variable of the subset of computer setting variables used to modify computer system settings;
   loading into computer readable memory the subset of computer setting variables;
   selecting at least one settings state with associated values for each group key and obtaining the associated values with the subset of computer setting variables, the associated values for each group key defined in the selected setting state, the at least one settings state including at least a True state and a False state;
   modifying the computer system settings corresponding with the subset of computer setting variables.

49. A method of configuring computer settings, the method comprising the steps of:
   associating a subset of computer setting variables with a group structure, comprising:
      identifying the group structure;
      defining actions and associated values for each computer setting variable of the subset of computer setting variables used to modify computer system settings;
   loading into computer readable memory the subset of computer setting variables;
   modifying the computer system settings corresponding with the subset of computer setting variables; and
   using a graphical interface (GUI) comprising:
      displaying a registry editor tab comprising:
         displaying the computer setting variables; and
         obtaining user input for at least selecting and editing the computer setting variables;
      displaying a user defined settings tab comprising:
         displaying group structures stored in a user defined XML file;
         obtaining user input for selecting a group structure; and
         applying a setting state of a group structure; and
      displaying an advanced system settings tab comprising:
         displaying group structures stored in a predefined XML file;
         obtaining user input for selecting a group structure; and
         applying a setting state of a group structure.

* * * * *

UNITED STATES PATENT AND TRADEMARK OFFICE
CERTIFICATE OF CORRECTION

PATENT NO.       : 8,037,469 B2
APPLICATION NO.  : 11/545335
DATED            : October 11, 2011
INVENTOR(S)      : Newman et al.

It is certified that error appears in the above-identified patent and that said Letters Patent is hereby corrected as shown below:

In the Specification:

In Column 5, Line 42, delete "a the" and insert -- the --, therefor.

In Column 6, Line 43, delete "information" and insert -- information. --, therefor.

In Column 8, Line 9, delete "the has" and insert -- that has --, therefor.

In Column 8, Line 11, delete "the has" and insert -- that has --, therefor.

In Column 10, Line 24, delete "908" and insert -- 908. --, therefor.

In the Claims:

In Column 20, Line 58, in Claim 44, delete "Electronic" and insert -- An electronic --, therefor.

In Column 22, Line 48, in Claim 49, delete "graphical" and insert -- graphical user --, therefor.

Signed and Sealed this
Twenty-third Day of April, 2013

Teresa Stanek Rea
*Acting Director of the United States Patent and Trademark Office*